Dec. 24, 1963     F. L. SEARS, SR     3,115,256
TREE LOADER
Filed Oct. 1, 1962
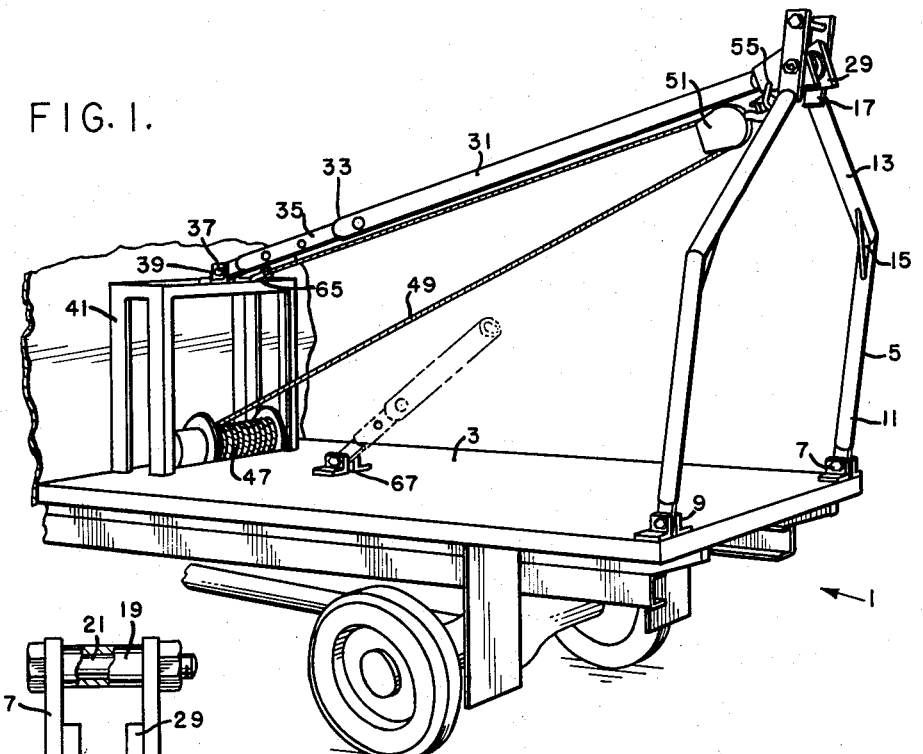
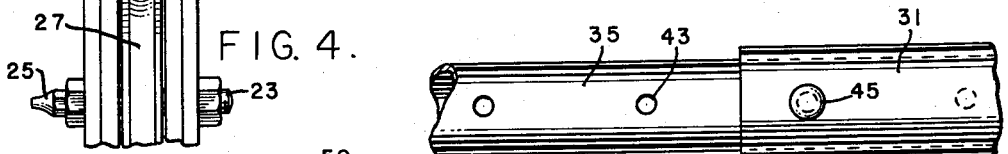
INVENTOR.
FRANK LEWIS SEARS, SR.
BY
*Walter J. Wesendorf Jr*
*Attorney*

United States Patent Office 3,115,256
Patented Dec. 24, 1963

3,115,256
TREE LOADER
Frank Lewis Sears, Sr., 239 Elk St., Albany, N.Y.
Filed Oct. 1, 1962, Ser. No. 227,137
4 Claims. (Cl. 214—3)

The problem in the act relating to the removal of cut trees is the present necessity of four or five men using appropriate block and tackle and other equipment to lift the cut tree, sometimes weighing five tons, onto a truck to haul same away to a dump or other place for suitable disposition of same.

Accordingly, the object of this invention is to provide a self-contained tree loading device which one man can operate to raise the cut tree, load same from the truck at the dump or other place where same is disposed of.

This object and other objects of the invention should be appreciated from the detailed specification taken in conjunction with the drawings in which like reference numerals refer to similar parts throughout the several views, in which:

FIG. 1 is a perspective view of the invention with an alternate disposition shown thereon;

FIG. 2 is a fragmentary view of the telescoping assembly;

FIG. 3 is a fragmentary view of the hook and hook latch;

FIG. 4 is a fragmentary front view of one of the sheave assemblies.

In the drawings, reference numeral 1 generally refers to the invention. At the rear end of the floor 3 of the truck are arranged two upstanding legs 5. Each one of the upstanding legs 5 is pivotally mounted by pins 7 retained by and between L-shaped brackets 9 suitably secured to the floor 3.

Each upstanding leg 5 has a lower leg portion 11 and an upper leg portion 13 angularly disposed therewith. A gusset plate 15 suitably secured to the lower leg portion 11 and upper leg portion 13 imparts structural rigidity to leg 5.

Extending upwardly from upper leg portions 15 and suitably secured therewith are mounting plates 17 which are spaced apart in assembly by a spacer bushing 19 disposed between plates 17 at the upper portion thereof and retained as disposed by means of a nut and bolt 21 the shank portion of which extends through holes formed through plates 17 and extends internally within bushing 19.

Disposed intermediate plates 17 is a nut and bolt 23 having at one end thereof an alemite grease fitting 25. The bolt 23 is machine hardened and freely mounts on its shank portion a bearing press fitted to which is sheave 27. A hole is suitably formed in the center of bolt 23, extends along its longitudinal axis and communicates suitably with the bearing fixed to sheave 27 to thereby permit internal lubrication.

Arranged adjacent sheave 27 and freely mounted on the shank portion of bolt 23 are plates 29 suitably secured to the remote end of female portion 31 of the adjustable telescoping assembly 33.

Received and reciprocable within the female portion 31 is male portion 35 pivotally mounted by pin 37 suitably retained between two L-shaped brackets 39. Brackets 39 are suitably secured to a support bracket assembly 41 suitably secured to floor 3. The support bracket assembly 41 comprises four depending legs suitably secured at their upper portions in spaced relationship from each other by laterally disposed framing members.

It should be appreciated that a hole is formed through the female portion 31 near one end thereof and several holes 43 are formed through the male portion 35 to permit adjustable disposition of the male and female portions of the assembly 33 relative to each other with retention of same afforded by a suitable locking pin 45 inserted through the hole in the female portion 31 and one of the holes 43 of the male portion 35.

A winch 47 is shown suitably disposed on the floor 3 of the truck with the cable 49 trained over a side open sheave 51 which is arranged and disposed by means of a hook 53 engaged with the hook support bracket 55. Bracket 55 is suitably secured to plates 29 and depends therefrom.

As indicated at 57, hook 53 is swivel mounted with respect to side open sheave 51 and a hole 59 formed through hook 53 receives and pivotally retains therein hook latch 61.

Hook latch 61 preferably is of ¼" steel with the portion of same not engaged in hole 59 being configured to prevent removal of hook 53 from the hook support bracket 55 except when latch 61 is moved to the alternate position as indicated by reference numeral 63.

Disposed at the end of cable 49 is hook 65 and is shown in the drawings as engaged with the support bracket assembly 41 when the tree loader is not in use.

Shown disposed on the floor 3 of the truck is another set of L-shaped brackets 67 for pivotally mounting the assembly 33 in another position.

In use, the operator girdles the truck of the cut tree to be removed with the cable 49 and secures same by locking the cable 49 with hook 65. As the cable is wound on the winch 47, the point will be reached where the tree will be raised and conducted onto the floor 3 of the truck.

The operation will be similar when the assembly 33 is pivotally mounted by L-shaped brackets 67. In that application the side open sheave is not utilized and the cable will be trained over sheave 27.

It should be further appreciated that all of the elements of the tree loader are made of suitable metal.

Having thus described my invention, I claim:

1. A tree loader for loading a cut tree onto floor structure; said tree loader comprising floor structure, upstanding legs, gusset plates, L-shaped brackets, mounting plates, a sheave, plates, an adjustable telescoping assembly of a male portion and a female portion, a support bracket assembly, a winch and cable carrying a hook at its end, a hook and a hook support bracket; each one of said upstanding legs being pivotally mounted on two of said L-shaped brackets secured to said floor structure by a pin retained by said L-shaped brackets, each one of said upstanding legs having a lower leg portion and an upper leg portion angularly disposed relative to its lower leg portion, one of said gusset plates being secured to said lower and upper leg portions of each one of said upstanding legs to impart structural rigidity and strength thereto, each one of said mounting plates being secured to one of said upper leg portions, said mounting plates being disposed in spaced relationship by a spacer bushing disposed between said mounting plates at the upper portions of said mounting plates and retained as thusly disposed by a first nut and bolt, said sheave being carried upon shank portion of a second bolt disposed intermediate said mounting plates and secured therewith by a second nut, said female portion of said adjustable telescoping assembly having said plates secured to its remote end, said plates being pivotally mounted on said shank portion of said second bolt, said male portion of said adjustable telescoping assembly being pivotally mounted by a pin retained between two of said L-shaped brackets secured to said support bracket assembly secured to said floor structure, said male portion of said adjustable telescoping assembly being reciprocable within said female portion thereof, said female portion of said adjustable telescoping assembly having a hole formed therethrough and said male portion thereof having several holes formed therethrough, adjustable disposition and retention of said male portion relative to said female portion being permitted upon alignment of said hole formed through said female portion with one of said holes formed through said male portion and insertion therethrough of a locking pin, said winch being carried by said floor structure and its cable being trained over said side open sheave, said side open sheave having a hook swivel mounted therewith and engaged with said hook support bracket depending from said plates, said hook being carried by said cable at its end for locking said cable girdled around the trunk of the cut tree prior to winding said cable on said winch to raise and conduct said cut tree onto said floor structure.

2. The subject matter as claimed in claim 1, wherein said support bracket assembly comprises four depending legs secured at their upper portions in spaced relationship from one another by laterally disposed framing members.

3. The subject matter as claimed in claim 1, wherein said hook swivel mounted to said side open sheave has a hole formed therethrough and therein receives and pivotally retains a hook latch to prevent removal of said hook upon engagement with said hook support bracket.

4. The subject matter as claimed in claim 1, wherein is further provided two of said L-shaped brackets secured to said floor structure to provide another position for the pivotal mounting of said male portion of said adjustable telescoping assembly.

References Cited in the file of this patent

UNITED STATES PATENTS

| | | |
|---|---|---|
| 2,292,353 | Ennis | Aug. 11, 1942 |
| 2,354,462 | Johnson | July 25, 1944 |
| 2,491,357 | Ashton | Dec. 13, 1949 |
| 2,541,970 | Pospisil | Feb. 13, 1951 |
| 2,773,606 | Shepherd | Dec. 11, 1956 |
| 2,919,107 | Halbrook | Dec. 29, 1959 |